United States Patent [19]
Yamazaki et al.

[11] Patent Number: 5,189,454
[45] Date of Patent: Feb. 23, 1993

[54] PHASE-TYPE FOCUSING SCREEN AND PROCESS FOR MANUFACTURING THE SAME

[75] Inventors: Schoichi Yamazaki; Hiroshi Matsui, both of Kanagawa, Japan

[73] Assignee: Canon Kabushiki Kaisha, Tokyo, Japan

[21] Appl. No.: 482,840

[22] Filed: Feb. 21, 1990

[30] Foreign Application Priority Data

Feb. 28, 1989 [JP] Japan ................... 1-047965
Jun. 28, 1989 [JP] Japan ................... 1-167907

[51] Int. Cl.$^5$ .......................... G03B 3/00; G03B 21/60
[52] U.S. Cl. ..................... 354/200; 359/443; 359/454
[58] Field of Search ............. 354/200, 201, 161; 350/126, 127, 128

[56] References Cited

U.S. PATENT DOCUMENTS 4,338,012  7/1982  Matsumura et al. ................ 354/200
4,982,214  1/1991  Matsui ................................. 354/200

FOREIGN PATENT DOCUMENTS 55-070827  5/1980  Japan .
62-269127  11/1987  Japan .

Primary Examiner—Michael L. Gellner
Assistant Examiner—Jae N. Noh
Attorney, Agent, or Firm—Fitzpatrick, Cella, Harper & Scinto

[57] ABSTRACT

A phase-type focusing screen includes is made by using two photo masks each having a plurality of unit pattern regions regularly arrayed, each of which has a plurality of minute patterns of a predetermined shape and different size irregularly arrayed in such a way that three or more plane portions of different height are formed in the surface of a substrate, wherein the light beams passing through the combined minute patterns are given phase differences as they are diffracted or scattered. Thus, a desired diffusing characteristic is imparted into the focusing screen.

5 Claims, 7 Drawing Sheets

PHASE-TYPE FOCUSING SCREEN AND PROCESS FOR MANUFACTURING THE SAME

BACKGROUND OF THE INVENTION

1. Field of the Invention

This invention relates to phase-type focusing screens and, more particularly, to phase-type focusing screens which, when used in, for example, the photographic camera or the like to form a finder image thereon, have a predetermined diffusing characteristic so that the finder image can be observed in good quality.

2. Description of the Related Art

There has been a previous proposal for forming a great number of minute patterns of a constant height and a predetermined shape on the surface of an optically transparent substrate so that the light beam passing through the minute patterns is given a phase difference relative to the other light beam to provide the focusing screen with a predetermined diffusing characteristic, i.e., a so-called bi-level form of the phase-type focusing screen, in, for example, Japanese Laid-Open Patent Application No. Sho 55-70827 and Japanese Laid-Open Patent Application No. Sho 62-269127.

FIG. 9 is a schematic perspective view of the main part of the phase-type focusing screen of the bi-level form shown in the specification of Japanese Laid-Open Patent Application No. 55-70827. In the same figure, reference numeral 101 denotes a substrate plate. Minute patterns 102 of a constant height are formed on the surface of the substrate plate 101. And, a light beam which passes through a region A constituting part of the surface of the substrate plate 101 and another light beam which passes through a region B constituting all the patterns 102 are given a phase difference to obtain a predetermined diffusing characteristic.

The focusing screens proposed in these publications, because of using the periodic array of the minute patterns, suffer from a strong influence of diffraction depending on the wavelength of light, so that the image the photographic system forms, when blurred, has color deviation. Another problem is that because the intensity distribution of the diffracted rays has discretely displaced peaks, those portions of the formed image which are out of the depth of focus give an unpleasant impression.

Particularly with the bi-level phase-type focusing screen, the degree of color stain in the image of the 0th, ±1st, ±2nd and higher order diffracted rays is roughly determined by the distance between the two levels or the depth (phase) of the concave and convex profiles. To correct this was a hard task. For the 0th order light intensity, the possible minimum is limited to 4–5%. To decrease the minimum from this value was, in the general case, another very difficult problem.

As related art, there is U.S. patent application Ser. No. 359,487 filed on May 31, 1989.

SUMMARY OF THE INVENTION

An object of the invention is to provide a phase-type focusing screen comprising an optically transparent substrate on which a great number of minute patterns of convex and/or concave profile and a predetermined shape are irregularly arrayed in a unit pattern region, and a plurality of the unit pattern regions are regularly arrayed to form a pattern portion, and, also, a plurality of the pattern portions are laminated under certain conditions with an advantage that the intensity (white color) and the degree of color stain in an imaged with the 0th order diffracted rays and further the degree of color stain in an image with the diffusing rays are so much reduced that when applied to the finder system, a good finder image can be observed.

A second object is to provide a focusing screen production technique which enables such a focusing screen to be manufactured in a very simple way.

The phase-type focusing screen according to the invention has a plurality of kinds of pattern portions, each of which comprises a regular array of a plurality of unit pattern regions, in each of which a plurality of minute patterns of convex or concave profile and a predetermined shape are irregularly arrayed on an optically transparent substrate in such a way that three or more flat planes of different height including a reference plane are formed, so that light passing through this combined pattern portion is diffracted and/or scattered to a number of beams to impart a phase difference among the light beams, thus making the focusing screen have a desired diffusing characteristic.

DETAILED DESCRIPTION OF THE PREFERRED EMBODIMENTS

Figure 12:
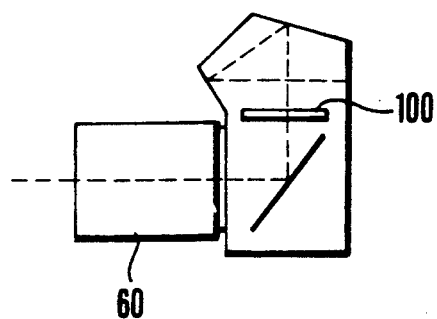
FIG. 12 is a side sectional view of a single-lens reflex camera employing the focusing screen of the invention.

The invention is next described in connection with embodiments thereof applied to the focusing screen in the single-lens reflex camera shown in FIG. 12 where a focusing screen 100 relevant to the invention is arranged in a conjugate position to a film plane on which a photographic lens 60 forms an image of an object.

Figure 1:
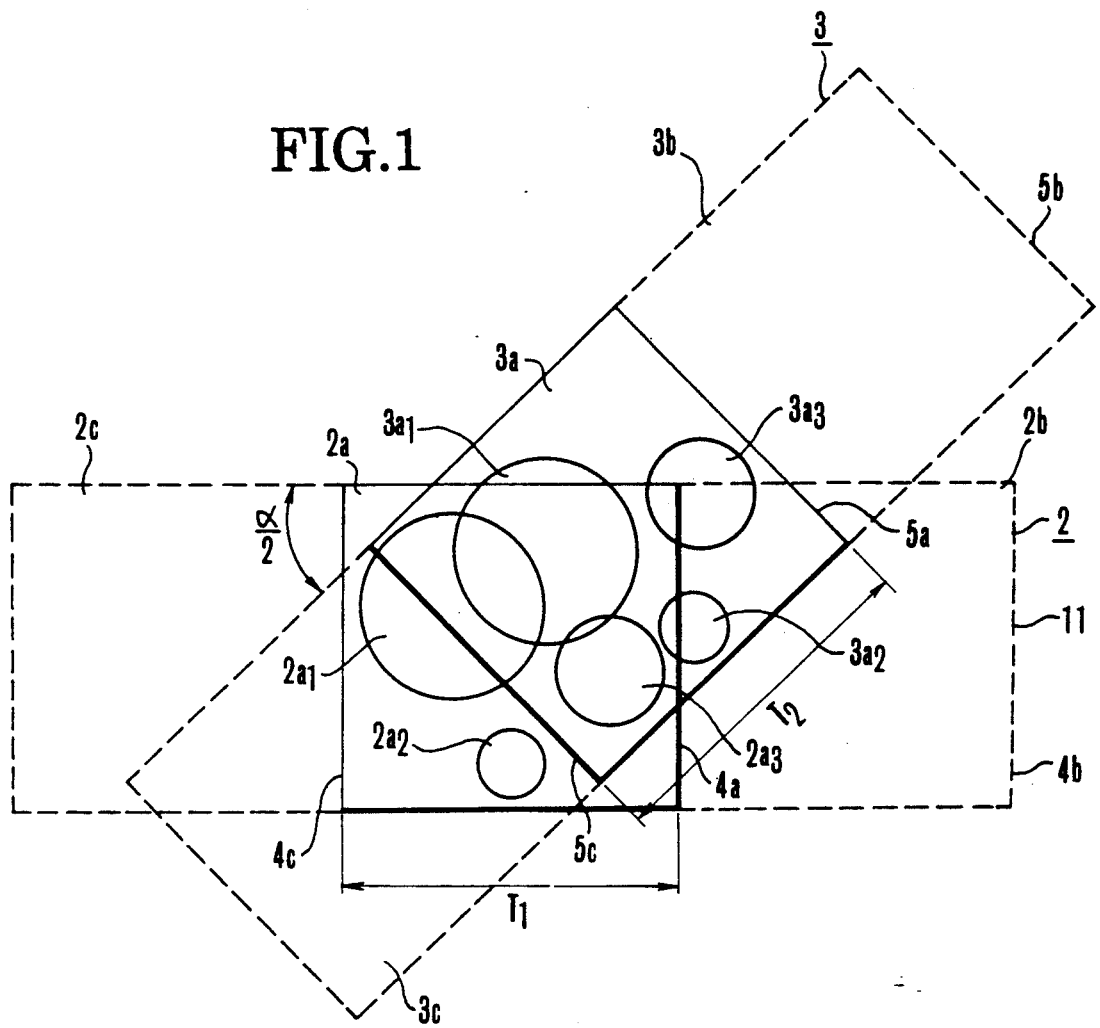
FIG. 1, FIG. 3, FIG. 5, FIG. 6, FIG. 7 and FIG. 8 are schematic fragmentary plan views of first to sixth embodiments of the invention, respectively.

FIG. 1 is a geometric diagram of the first embodiment of the invention.

In the same figure, reference numeral 11 denotes a transparent substrate, and reference alphanumeric characters 2a–2c each denote a unit pattern region, a great number of which are regularly arrayed on the substrate 11 with a pitch T1, thus forming a first pattern portion 2. Reference alphanumeric characters 3a–3c each denote a unit pattern region, a great number of which are periodically (regularly) arrayed with a pitch T2 in laminated relation on the first pattern portion 2 (substrate 11), thus forming a second pattern portion 3. Minute patterns $2a_1$–$2a_n$ or $3a_1$–$3a_n$ of round shape with different sizes (diameters) in convex and/or concave (protrudent and/or recessed) profile are made of either the same, or a different, material as or from that of the substrate 11 and are irregularly arrayed within the unit pattern region 2a or 3a. In more detail, arraying of all the minute patterns within the common unit pattern region is so irregular that any two of them do not fall in point symmetry to each other (or are offset by 1 micrometer or more).

Incidentally, line segments 4a–4c and 5a–5c each indicate an imaginary boundary between the adjacent two of the unit pattern regions for the purpose of convenience, so they are actually not provided. The other unit pattern regions 2b, 2c, 3b and 3c, too, each have a similar array of minute patterns, though not shown in FIG. 1.

The pattern portion 2 and the pattern portion 3 are constructed to a laminated form in displaced relation by an angle (45°) almost equal to ½ of the angle α (90°) the normals of the sides of the unit pattern regions 2a and 3a make with each other as shown in FIG. 1.

Figure 2:
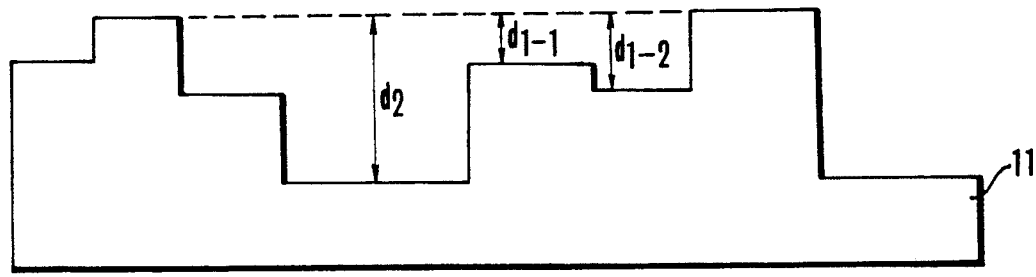
FIG. 2 is a cross-sectional view taken along an arbitrary line of FIG. 1.

And, the shapes and depths of the minute patterns are so determined that the concave or convex profile of the combined pattern portions 2 and 3 in an arbitrary cross section has at least three different plain portions (three or more levels) as shown in FIG. 2.

In the present embodiment, as shown in FIGS. 1 and 2, to make the minute patterns on the substrate 11, the above-described rules of design are set forth. By this, in application to, for example, the focusing screen, an improved result is effected. That is, for the light beams passing through the regions of the minute patterns of different level, at least two predetermined phase differences are given, and, at the same time, a predetermined distribution in two dimensions of the phase differences is given, when diffraction and light scattering are made to take place. Thus, a phase-type focusing screen having a desired diffusion characteristic is obtained.

The use of such a concave or convex profile with, for example, four different heights in the combined minute patterns as in the present embodiment, or the so-called 4-level form of the phase-type focusing screen, provides a possibility of occurrence of light cancellation owing to the combined shape due on the 1st and 2nd levels, the 1st and 3rd levels, the 1st and 4th levels, the 2nd and 3rd levels, the 2nd and 4th levels, and the 3rd and 4th levels. Hence, the white 0th order light intensity can be reduced to below 1%.

Further, concerning the color unevenness, with the use of the bi-level form as in the prior art, the 0th order light for white color allows a blue or red color component to be left. Hence, all colors ranging from blue to red will appear. In the present invention, on the other hand, by increasing the number of levels to three or more, the intensity of each of the blue, green and red components can be minimized. Thus, the 0th order light for white color is made to have a better whiteness than when the bi-level form is in use.

In the present invention, the unit pattern regions 2a–2c, 3a–3c, are made to be arrayed periodically in structure with an advantage that no appreciable granularity is seen by the observer. In particular, to this purpose, it is desirable that the repetition pitch (period) T ($T_1$ and $T_2$ for the first and second pattern portions 2 and 3 respectively) of the unit pattern regions is chosen so as to fall within a range: 20 $\mu m \leq T_1 \leq 50$ $\mu m$ and 20 $\mu m \leq T_2 \leq 50$ $\mu m$. If below 20 $\mu m$, the minimum possible line width would be narrower than 0.5 $\mu m$ in portions. So, a difficult production technique must be used. If above 50 $\mu m$, the granularity gets appreciable. This should be avoided.

As to the depth, it is recommended that the level lies at or near $\pi$, or 2$\pi$ in phase difference. In particular, the depth $d_1$ for a phase difference of $\pi$ or thereabout and the depth $d_2$ for another phase difference of 2$\pi$ or thereabout are desired to lie in the following ranges:

$$0.38\lambda/(n-1) \leq d_1 \leq 0.62\lambda/(n-1) \quad (1)$$

$$0.72\lambda/(n-1) \leq d_2 \leq 1.1\lambda/(n-1) \quad (2)$$

where $\lambda$ is the design wavelength in the visible light region, and n is the refractive index of the material.

In a specific embodiment where $\lambda = 600$ nm and the material is acryl of n = 1.49118, $$0.46 \ (\mu m) \leq d_1 \leq 0.76 \ (\mu m) \quad (3)$$

$$0.88 \ (\mu m) \leq d_2 \leq 1.34 \ (\mu m) \quad (4)$$

When these conditions are satisfied, an improved light distribution characteristic is obtained.

To further improve the light distribution characteristic, it is recommended that, in particular, the depth $d_1$ or $d_2$ is included with two or more levels, the total sum of the successive differences of which falls within the above-defined range. When the depth $d_1$ or $d_2$ falls outside this range, the amount of the white 0th order light increases objectionably.

In view of using it as the focusing screen, for good observation, it is better as a general rule that, as two pattern portions of different kinds are to be superimposed one upon the other, the repetition periods of the unit pattern regions in the two kinds of pattern portions are made more equal to each other than they differ.

On this account, in the present embodiment, when the pattern portions are formed on the surface of the substrate 11 in two-layer laminated relation, letting the larger one of the repetition periods of the unit pattern regions of the laminated pattern portions be denoted by T1 and the smaller one by T2, the following relationship is set forth:

$$|T1-T2|/T1 \leq 0.6 \quad (5)$$

By this, it is possible to assure that a finder image of good color hue is observed.

Particularly, "T1-T2=0" is desirable since the white 0th order light amount becomes minimum.

When the range of the inequality of condition (5) is exceeded, the balance of the intensity distribution in the diffraction image (the light distribution characteristic) becomes worse, causing in particular the higher order diffracted rays to become too weak.

Also, in general, for the focusing screen used in the camera or the like, it is particularly required that as an image of a scene is formed in the finder by the photographic system, while the sharp image of a subject in the scene is bright, the blurred image of that portion of the environment surrounding the subject which lies beyond the depth of field gives a good impression to the observer. As the focusing screen, it becomes important to preserve these two features in good balance.

For this reason, in the present embodiment, the pattern portions are made in the 2-layer form, and, as these two layers are laminated one upon the other, the two pattern portions are made to be of one and the same pattern shape. Accordingly, it is possible to achieve a focusing screen which has a small amount of white 0th order light and gives 1st order diffracted light of increased strength so that the image of an object out of the depth of field can be blurred point-symmetrically in continuously changing degrees.

Figure 3:
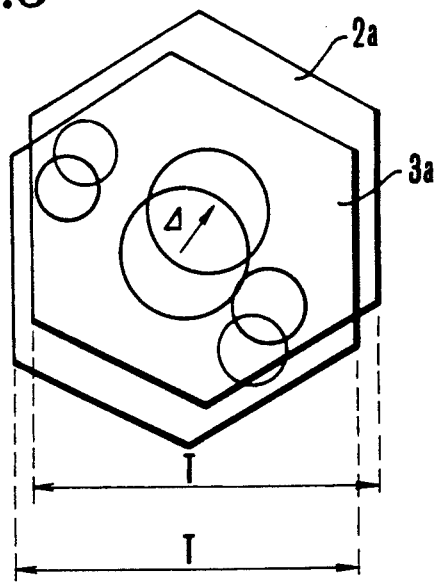

Another feature of the present embodiment is that the superimposing is done under a condition that the two pattern portions are either rotated in their planes relative to each other by an angle equal to ½ of the angle α the normals of the sides of the unit pattern regions make with each other as shown in FIG. 1, or/and are displaced in parallel to each other in a direction indicated by an arrow by a distance Δ as shown in FIG. 3 (the second embodiment). Thus, a finder image of which the blurring gives good impression is obtained.

Incidentally, FIG. 3 shows another case where the unit pattern region is of hexagonal shape.

For the angular offset of the two pattern portions, it is recommended that the angle of rotation takes one of the values: $\alpha \pm 10°$ and $\alpha/2 \pm 10°$. If this range is neglected, the blurred image on the focusing screen in question will appear as if its details are barely lost.

Also when the parallel offset is used in superimposing, there is a need to take it into account that all the minute patterns in one unit pattern region do not utterly coincide with those of the other unit pattern region (the discrepancy is 0.2 μm or more). If the minute patterns of one unit pattern region just coincide with those of the other unit pattern region, as it implies that the phase difference is $2\pi$ alone, the 0th order light becomes too strong. So, a poor result will be effected.

Taking an example of construction by parallel displacement Δ, it is recommended to satisfy the following condition:

$$|\Delta| < Ta/2 \quad (6)$$

where Ta is the mean value of the repetition pitches of the two pattern portions.

When the inequality of condition (6) is violated, moiré appears. As the deviation increases, the moiré gets more conspicuous when observing the finder image.

Figure 4:
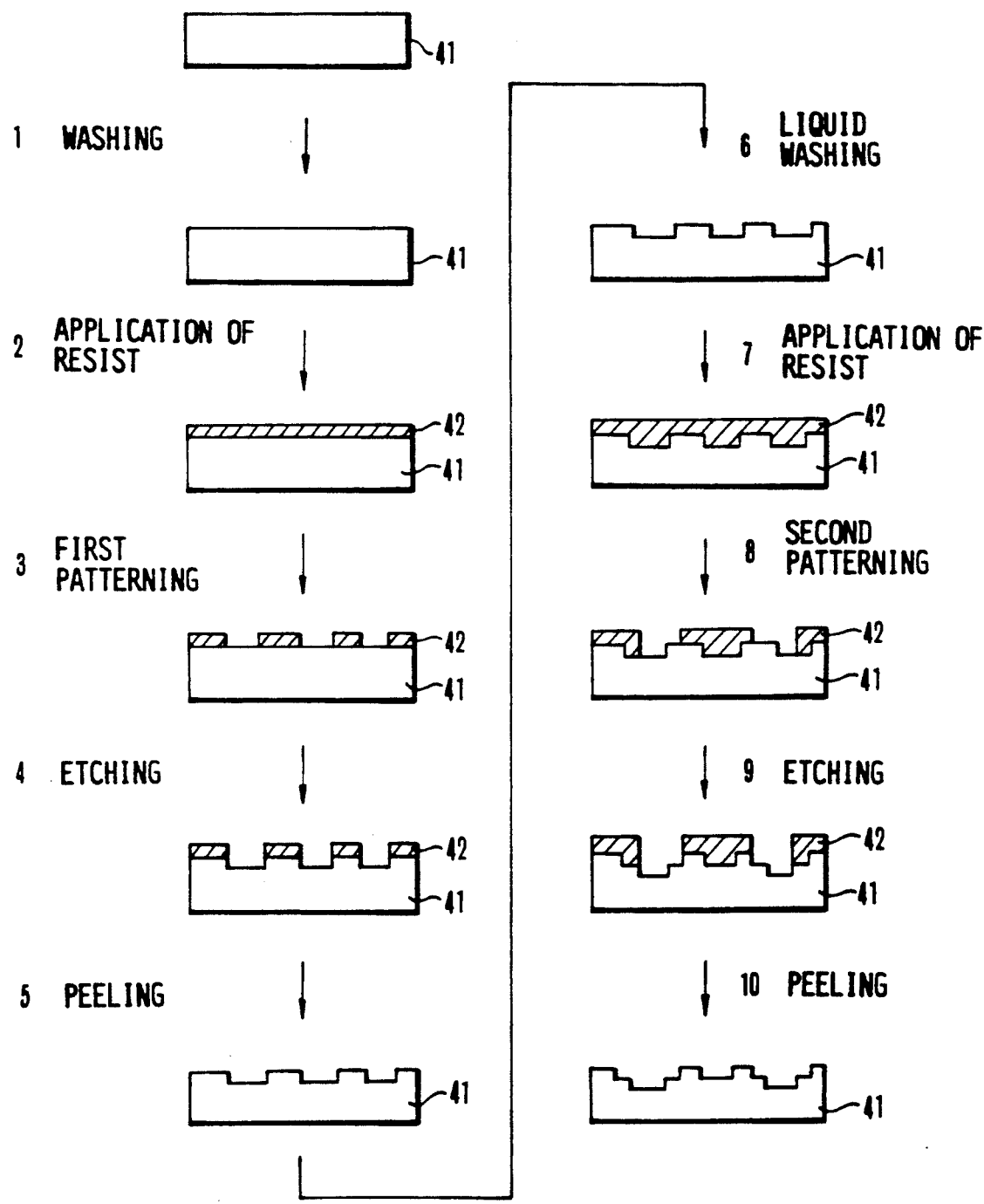
FIG. 4 is a diagram for explaining a practical example of the process for manufacturing the phase-type focusing screen of the invention.
Figure 6:
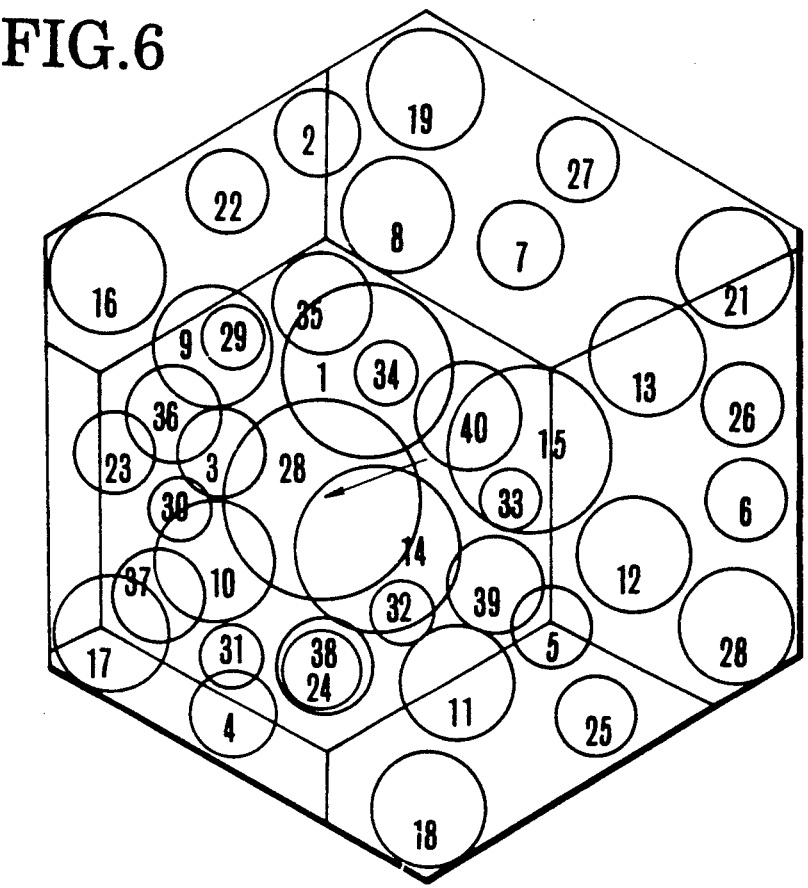
Figure 7:
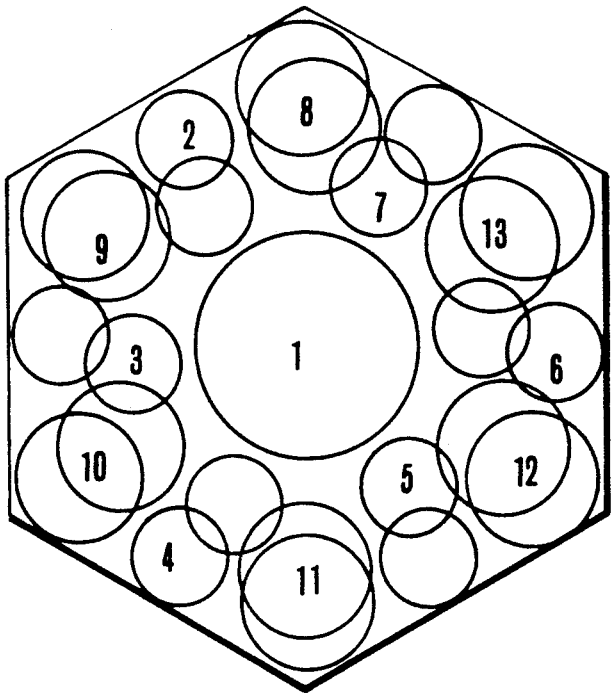

A practical example of the way in which two pattern portions are laminated on the surface of the substrate is next described by reference to FIG. 4.

A first process: After a substrate 41 has been washed, a photosensitive resin coating, silver halide coating or the like, resist 42 is applied on one of the surfaces of the substrate 41, then exposed past a pattern mask either in contact, or at a reduced scale, and then developed or bleached to form the convex or concave portions. In particular, as the resist, a positive type resist of high resolving power is used. (Steps (1), (2) and (3)).

A second process: The substrate 41 is etched to a predetermined depth. Then the remaining resist coating portions are peeled off to obtain a base plate. (Steps (4) and (5)).

A third process: Similarly to the first process, a photosensitive resin or silver halide resist coating is applied likewise to the base plate. Using a different pattern mask or the same pattern mask, and offsetting the base plate and the pattern mask angularly or linearly by a predetermined amount, exposure followed by development or bleaching is carried out to remove the resist coating in the new portions. (Steps (6), (7) and (8)).

A fourth process: Similarly to the second process, etching is carried out to form on the surface of the substrate 41 new recesses of a depth either equal to or different from the aforesaid predetermined amount. Then the remaining resist coating portions are removed. (Steps (9) and (10)).

Thus, the first and second processes in sequence are repeated a number of times depending on the required number of levels to obtain a phase-type focusing screen of successively stepped down structure.

In the present embodiment, if, as two pattern portions are laminated on the surface of the substrate 41, the depth of the recesses formed by using the second pattern mask is made equal to that of the recesses formed by the first pattern mask, a phase-type focusing screen having three levels is obtained. If these depths are made different from each other, the number of levels in the obtained focusing screen is increased to four as shown in FIG. 2.

As another manufacturing method in the present embodiment, the aforesaid first process may be modified so that multiple exposures are made with the use of two different pattern masks, or one and the same pattern mask and then development or bleaching is carried out to form three or more levels with the resist coating on the substrate 41. Then the second process is carried out.

Another example of modification is that a plurality of pattern masks of different kind are superimposed one upon another in angular or linear offset to form one sheet of composite pattern mask having a density distribution. In the first process, exposure is made once and then development or bleaching is carried out to form a convex or concave profile of three or more levels. Then, the etching of the second process follows.

FIG. 5 to FIG. 8 are plan views of the main parts of the third to sixth embodiments of the invention respectively.

In each of these embodiments, the focusing screen is constructed with two pattern portions A and B in laminated form. Each of these figures shows one unit pattern region of the respective individual pattern portion.

Also, the boundary line segments defining the unit pattern region are shown for the purpose of better understanding, and not really depicted on the surface of the substrate.

Let us now denote the size of area of the unit pattern region by SU, the total number of minute patterns within the unit pattern region by iTL, the size of area of the i-th minute pattern in the unit pattern region by SP(i), and the number of those of the values obtained by normalizing the size of area of the i-th minute pattern by the size of area of the unit pattern region, i.e., SP(i)/SU with i=1 through iTL, which falls in a certain range by iSNO.

Figure 5:
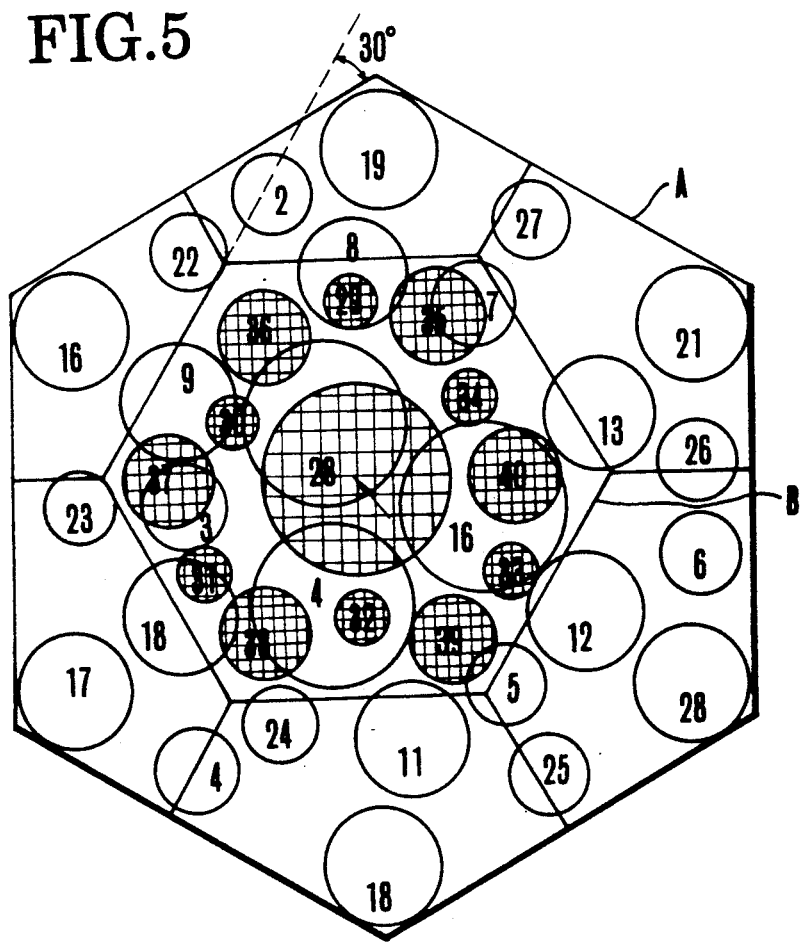

In the third embodiment shown in FIG. 5, of the two pattern portions A and B, one pattern portion A has round minute patterns of five different sizes irregularly arrayed in one unit pattern region of regular hexagon whose one side is 25 μm long.

A number of such unit pattern regions in the pattern portion A are regularly arrayed at a repetition pitch T1=43.3 μm. Also, $iSNO/iTL = 0.89$ in $SP(i)/SU \leqq 0.025$
$iSNO/iTL = 0.11$ in $0.025 < SP(i)/SU \leqq 0.05$
$iSNO/iTL = 0$ in $0.05 < SP(i)/SU \leqq 0.10$
$iSNO/iTL = 0$ in $0.10 < SP(i)/SU$ $$\left( \sum_{i=1}^{iTL} SP(i) \right)/SU = 0.50$$

The other pattern portion B has round minute patterns of five kinds of different sizes irregularly arrayed in each unit pattern region of regular hexagon whose side is 15 μm long.

The repetition pitch T2 of the unit pattern region in the pattern portion B is T2=26 μm. Also,

```
iSNO/iTL = 0.46 in         SP(i)/SU ≦ 0.025
iSNO/iTL = 0.46 in 0.025 < SP(i)/SU ≦ 0.05
iSNO/iTL = 0    in 0.05  < SP(i)/SU ≦ 0.10
iSNO/iTL = 0.80 in 0.10  < SP(i)/SU
```

$$\left( \sum_{i=1}^{iTL} SP(i) \right) / SU = 0.50$$

And, in the present embodiment, the pattern portion B is turned 30° and further parallel-displaced 1 μm to superimpose its convex or concave profile on that of the pattern portion A. The level differences at $\lambda=600$ nm, $n=1.1471$ (for $\lambda=600$ nm), as using the symbols shown in FIG. 2 (hereinafter the same applies), are $d_{1-1}=0.54$ μm $d_{1-2}=0.57$ μm $d_2=1.11$ μm and $|T1-T2|/T1=0.40$ A fourth embodiment shown in FIG. 6 uses similar pattern portions A and B to those of the third embodiment of FIG. 5 except that one of them is parallel-displaced by 3 μm from the other. The level differences in the convex or concave profile of the minute patterns at $=600\lambda$nm, $n=1.471$ (for $\lambda=600$ nm) are $d_{1-1}=0.53$ μm $d_{1-2}=0.58$ μm $d_2=1.11$ μm and $|T1-T2|/T1=0.40$ A fifth embodiment shown in FIG. 7 has two pattern portions of the same pattern shape superimposed in such a way that one of them is rotated 180° relative to the other.

In the present embodiment, round minute patterns of four kinds of different sizes are irregularly arrayed in each unit pattern region of a regular hexagon whose side is 20 μm long. All the unit pattern regions of a regular hexagon are regularly arrayed in adjoining relation to each other. Their repetition period T1 has a value of 34.6 μm. Also,

```
iSNO/iTL = 0.46 in         SP(i)/SU ≦ 0.025
iSNO/iTL = 0.46 in 0.025 < SP(i)/SU ≦ 0.05
iSNO/iTL = 0    in 0.05  < SP(i)/SU ≦ 0.10
iSNO/iTL = 0.80 in 0.10  < SP(i)/SU
```

$$\left( \sum_{i=1}^{iTL} SP(i) \right) / SU = 0.50$$

The level differences in the convex or concave profile by the minute patterns at $\lambda=600$ nm, $n=1.471$ (for $\lambda=600$ nm, are $d_{1-1}=0.50$ μm $d_{1-2}=0.67$ μm $d_2=1.17$ μm Because the repetition period is T1=T2, $|T1-T2|/T1=0$ results.

Figure 8:
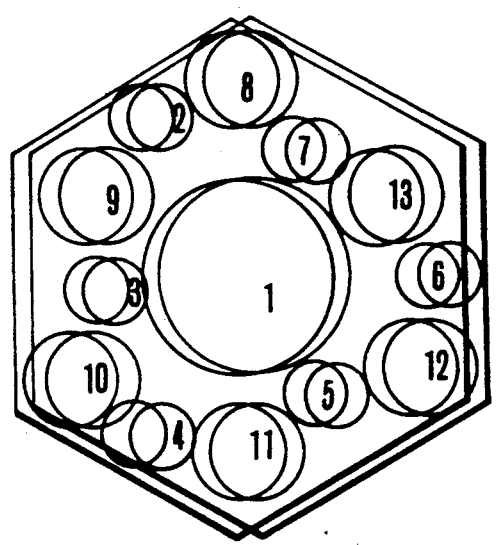
Figure 9:
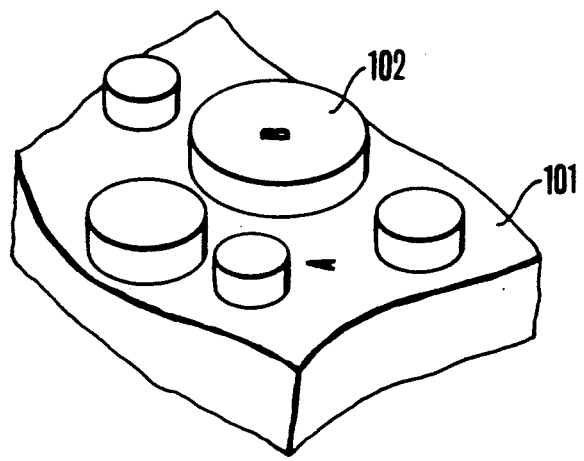
FIG. 9 is a perspective view of the main parts of the prior known bi-level phase-type focusing screen.

A sixth embodiment shown in FIG. 8 has two pattern portions superimposed in such a way that one of them is parallel-displaced 0.5 μm from the other.

In the present embodiment, round minute patterns of five kinds of different sizes are irregularly arrayed in each unit pattern region of a regular hexagon whose side is 15 μm long. Their repetition period T1 is 26 μm. Also,

```
iSNO/iTL = 0.46 in         SP(i)/SU ≦ 0.025
iSNO/iTL = 0.46 in 0.025 < SP(i)/SU ≦ 0.05
iSNO/iTL = 0    in 0.05  < SP(i)/SU ≦ 0.10
iSNO/iTL = 0.08 in 0.10  < SP(i)/SU
```

And the level differences in the convex or concave profile by the minute patterns at $\lambda=600$ nm, $n=1.471$ ($\lambda=600$ nm) are $d_{1-1}=0.57$ μm $d_{1-2}=0.75$ μm $d_2=1.30$ μm Because the repetition period T1=T2, $|T1-T2|/T1=0$.

Figure 10A:
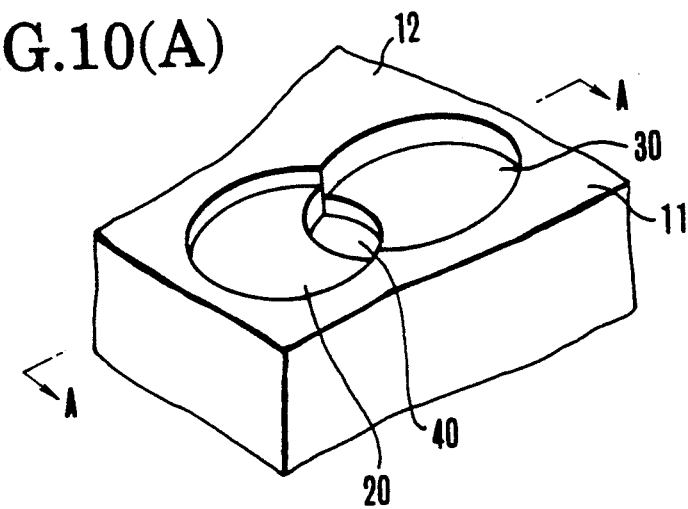
FIG. 10(A) and FIG. 11 are perspective views of the main parts of seventh and eighth embodiments of the invention, respectively.
Figure 10B:
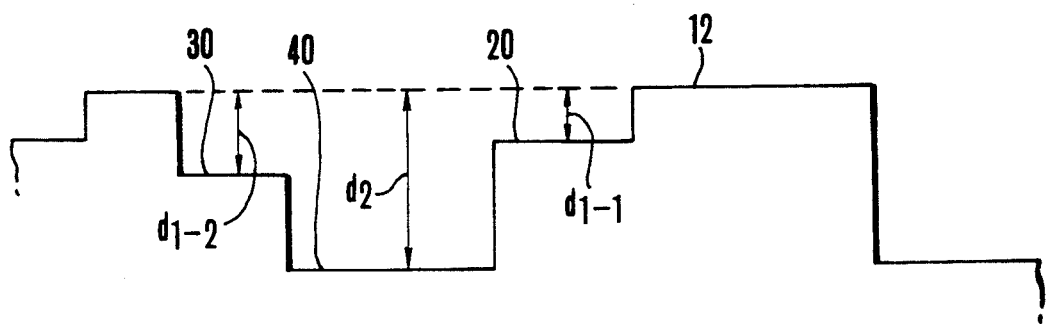
FIG. 10(B) is a cross-sectional view taken along line A—A of FIG. 10(A).

FIG. 10(A) and is a perspective view of the main parts to explain in more detail the embodiment in which the minute patterns are superimposed to form four levels, and FIG. 10(B) is a cross-sectional view seen from the line A—A of FIG. 10(A).

In these figures, the substrate 11 is made of optically transparent material. The upper surface of the substrate 11 is regarded as a reference surface 12 forming a first level.

A first convex or concave pattern 20 consists of, as viewed from the reference surface 12 of the substrate 11 FIG. 10(A) as the standard, recess-shaped patterns for giving a phase difference $\theta_1$ to the entering light beams, forming the second level. A second convex or concave pattern 30 consists of patterns whose layout superimposes on at least part of the layout of the patterns of the first convex or concave pattern 20 and which, as viewed in FIG. 10(A), are recessed deeper to give a phase difference $\theta_2$ to the entering light beams, forming a third level. A third convex or concave pattern 40 consists of patterns in the superimposed regions of the first and second convex or concave patterns 20 and 30, forming a fourth level which gives a phase difference $(\theta_1+\theta_2)$ to the entering light beams.

The first level 12 to the fourth level 40 differ from one another in depth as shown in FIG. 10(B). The light beams passing through these depths are given respective different phase differences 0, $\theta_1$, $\theta_2$ and $(\theta_1+\theta_2)$, in other words, four levels of phase difference when the entering light is diffracted and/or scattered. In such a manner, a so-called 4-level phase-type focusing screen having a desired diffusing characteristic is constructed.

As has been described before, the prior known phase-type focusing screen of the bi-level form gets the gamut of colors of the 0th order light for white color to have blur or red components of excessive intensity, causing a color unevenness to appear over the range of the blue to red color.

By contrast, in the present embodiment, light passing through the focusing screen is diffused in such a way that the light beams having passed through the reference surface 12 and the i-th convex or concave pattern (i=1, 2, 3), through the first convex or concave pattern and the j-th convex or concave pattern (j=2, 3), and further through the second convex or concave pattern and the third convex or concave pattern, superimpose and interfere on and with each other in each pair, before they exit from the focusing screen.

That is, the light beams in each of such combinations cancel each other's colors to make flat the spectral characteristic of all the diffused light, thus making it possible to observe the finder image of good quality with a uniform gamut of colors.

In particular, in the present embodiment, the gamut of colors of the 0th order light of the white color can be brought to a better whiteness than by the bi-level phase-type focusing screen, so that the color unevenness is improved.

In the 4-level phase-type focusing screen in the present embodiment, likewise as the bi-level phase-type focusing screen, minute patterns (which are not in point symmetry (offset by 1 μm or more) in the unit grating) must be arranged in the pattern portions superimposed one upon the other, and the unit grating must be of periodic structure. Otherwise, when observed through such a finder system, the granularity will come to be conspicuous.

To concretely show numerical examples, let us denote the design wavelength of light by λ, the refractive index for the wavelength λ of the material of the substrate by n, the depth corresponding to the phase difference $\theta_1$ by $d_{1-1}$ as shown in FIG. 10(B), the depth corresponding to the phase difference $\theta_2$ by $d_{1-2}$ and the depth corresponding to the phase difference $(\theta_1 + \theta_2)$ by $d_2$. Then, in the present embodiment, all the design parameters take the numerical values listed below.

NUMERICAL EXAMPLE 7

$\theta_1 = d_{1-1}(n-1) = 0.45\lambda$ $\theta_2 = d_{1-2}(n-1) = 0.59\lambda$ $\theta_1 + \theta_2 = d_2(n-1) = 1.04\lambda$

NUMERICAL EXAMPLE 8

Figure 11:
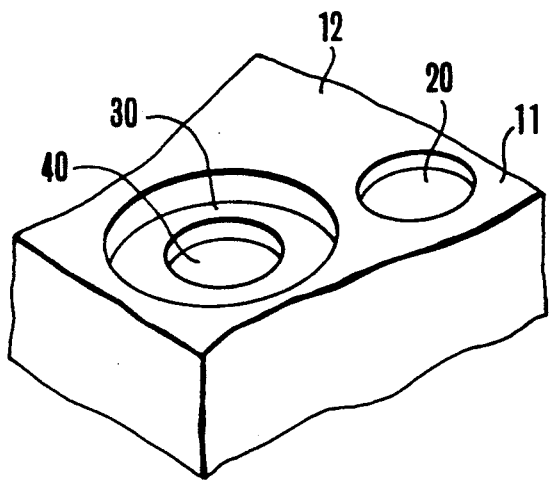

$\theta_1 = d_{1-1}(n-1) = 0.39\lambda$ $\theta_2 = d_{1-2}(n-1) = 0.53\lambda$ $\theta_1 + \theta_2 = d_2(n-1) = 0.92\lambda$ FIG. 11 is a perspective view of the main parts of another embodiment of the invention.

Incidentally, in the same figure, the similar parts to those of FIG. 10(a) are denoted by the same reference numerals.

In the present embodiment, when the second convex or concave pattern 30 is formed, its pattern layout is so adjusted as to include all the patterns of the first convex or concave pattern 20. Hence, the superimposed regions of both patterns form a third convex or concave pattern 40.

And, similarly to the embodiment shown in FIG. 10(A), taking the reference surface 12 as the standard, the entering light beams are given four phase differences 0, $\theta_1$, $\theta_2$ and $(\theta_1 + \theta_2)$ or different four levels of phase difference, thus providing a phase-type focusing screen having a desired diffusion characteristic.

According to the present invention, laminating of a plurality of pattern portions each having a regular array of a plurality of unit pattern regions in each of which a plurality of minute patterns of predetermined shape in convex and/or concave profile are irregularly arrayed, is made under certain conditions described before so that a stepped structure of three or more levels is easily obtained. Hence, it is made possible to provide a phase-type focusing screen having advantages that the intensity (white color) and the degree of color stain of the 0th order diffracted light and further the degree of color stain of the diffused light are minimized and that, in application to, for example, the finder system, a finder image of good distribution characteristic and beautiful images in the blurred portions can be observed.

What is claimed is:

1. A focusing screen positioned at or near an image which a photographic lens forms, comprising:
   a first pattern portion having a plurality of first unit pattern regions periodically arrayed, each unit pattern region having a plurality of irregularly arrayed minute patterns of protrudent and/or recessed profile; and
   a second pattern portion having a plurality of second unit pattern regions periodically arrayed, each unit pattern region having a plurality of irregularly arrayed minute patterns of protrudent and/or recessed profile,
   wherein said first and second pattern portions are superimposed one upon the other to form at least three plane portions, and said plane portions each having a level difference and wherein said level difference is plural in number, and one $d_1$ of the level differences and another one $d_2$ satisfy the following conditions:

$0.38\lambda/(n-1) \leq d_1 \leq 0.62\lambda/(n-1)$ $0.72\lambda/(n-1) \leq d_2 \leq 1.1\lambda/(n-1)$ wherein n is a refractive index of the material of said focusing screen and λ is a predetermined working wavelength in the visible light region.

2. A focusing screen according to claim 1, wherein said first and second pattern portions are offset.

3. A focusing screen according to claim 2, wherein said first and second pattern portions have the same shape unit pattern regions.

4. A focusing screen positioned at or near an image which a photographic lens forms, comprising:
   a first pattern portion having a plurality of first unit pattern regions periodically arrayed, each unit pattern region having a plurality of irregularly arrayed minute patterns of protrudent and/or recessed profile; and
   a second pattern portion having a plurality of second unit pattern regions periodically arrayed, each unit pattern region having a plurality of irregularly arrayed minute patterns or protrudent and/or recessed profile, wherein said first and second pattern portions are superimposed one upon the other to form at least three plane portions, and said plane portions each having a level difference, said focusing screen satisfying the following condition:

$$|T_1-T_2|/T_1 \leq 0.6$$

where $T_1$ is the larger one of repetition periods of said unit pattern regions of said first and second pattern portions, and $T_2$ is the smaller repetition period.

5. A focusing screen according to claim 2, wherein said level difference is plural in number, and one $d_1$ of the level differences and another one $d_2$ satisfy the following conditions:

$$0.38\lambda/(n-1) \leq d_1 \leq 0.62\lambda/(n-1)$$

$$0.72\lambda/(n-1) \leq d_2 \leq 1.1\lambda/(n-1)$$

where n is a refractive index of the material of said focusing screen and $\lambda$ is a predetermined working wavelength in the visible light region.

* * * * *

UNITED STATES PATENT AND TRADEMARK OFFICE
CERTIFICATE OF CORRECTION

PATENT NO. : 5,189,454
DATED : February 23, 1993
INVENTOR(S) : Shoichi Yamazaki, et al.

It is certified that error appears in the above-indentified patent and that said Letters Patent is hereby corrected as shown below:

ON THE COVER PAGE

At [75], "Schoichi Yamazaki;" should read --Shoichi Yamazaki;--.

IN THE ABSTRACT

Line 1, "is made by using" should be deleted.

COLUMN 2

Line 65, "recessed" should read --recessed)--.

COLUMN 7

Line 11, "iSNO/iTL=0.80 in 0.10<SP(i)/SU" should read --iSNO/iTL=0.08 in 0.10<SP(i)/SU--.
Line 36, "=600$\lambda$nm," should read --$\lambda$=600$\lambda$nm,--.
Line 60, "iSNO/iTL=0.80 in 0.10<SP(i)/SU" should read --iSNO/iTL=0.08 in 0.10<SP(i)/SU--.
Line 68, "$\lambda$=600nm," should read --$\lambda$=600nm)--.

COLUMN 8

Line 34, "and" should be deleted.

UNITED STATES PATENT AND TRADEMARK OFFICE
CERTIFICATE OF CORRECTION

PATENT NO. : 5,189,454
DATED : February 23, 1993
INVENTOR(S) : Shoichi Yamazaki, et al.

It is certified that error appears in the above-indentified patent and that said Letters Patent is hereby corrected as shown below:

COLUMN 10

Line 67, "patterns or" should read --patterns of--.

Signed and Sealed this

Fifteenth Day of February, 1994

BRUCE LEHMAN

*Attest:*

*Attesting Officer*     *Commissioner of Patents and Trademarks*